United States Patent [19]

Alfenaar

[11] 4,202,767
[45] May 13, 1980

[54] PROCESS AND DEVICE FOR THE PURIFICATION OF WASTE WATER BY MEANS OF ELECTROFLOTATION

[75] Inventor: Marinus Alfenaar, Schinnen, Netherlands

[73] Assignee: Stamicarbon, B.V., Geleen, Netherlands

[21] Appl. No.: 709,534

[22] Filed: Jul. 28, 1976

[30] Foreign Application Priority Data

Aug. 6, 1975 [NL] Netherlands .................. 7509342

[51] Int. Cl.$^2$ ............................................. B03D 1/00
[52] U.S. Cl. .................................. 210/44; 210/221 M
[58] Field of Search ............................. 210/44, 221 M

[56] References Cited

U.S. PATENT DOCUMENTS

| | | | |
|---|---|---|---|
| 3,479,281 | 11/1969 | Kikindai et al. | 210/44 |
| 3,822,204 | 7/1974 | Sako et al. | 210/44 |

Primary Examiner—Thomas G. Wyse
Attorney, Agent, or Firm—Cushman, Darby & Cushman

[57] ABSTRACT

A process for removing suspended and emulsified substances from waste waters comprising passing the waste water through a pair of electrodes, the physical disposition of said electrodes being such that one of the electrodes is situated horizontally above the other electrode, is disclosed. A requirement of the process is that the electrodes which are used are formed of a perforated material.

8 Claims, No Drawings

PROCESS AND DEVICE FOR THE PURIFICATION OF WASTE WATER BY MEANS OF ELECTROFLOTATION

The invention relates to a process for separating emulsified or suspended substances from waste water by an electroflotation process in which electrodes consisting of perforated material are employed. Waste water is passed through the electrodes to cause the emulsified or suspended substances to float in a foam which is removed from the waste water.

BACKGROUND OF THE INVENTION

The flotation method is used in many fields of engineering, including that of waste-water purification. The flotation method however was not useful for removing emulsified or suspended solids from aqueous emulsions, dispersions and colloidal solutions.

The generation of large quantities of very small gas bubbles by means of electrolysis is also known, and is described, for instance in German Pat. No. 1,203,702. The very small dimensions of the gas bubbles generated by electrolysis enable the flotation method to be used for aqueous emulsions, dispersions and colloidal solutions. To optimize the results of this flotation method, which is effected substantially in the liquid column above the lowermost, relatively coarse-mesh electrode, both chemicals and a constant supply of energy are required. Moreover, that method necessitates relatively long treating times of 10–15 minutes.

The object of the invention is to reduce the period of time required for treatment to result in the electroflotation of emulsions, dispersions or colloidal solutions, to achieve a considerable saving of energy cost, and to eliminate the use of flotation chemicals. Another object is to reduce the size of the necessary device while maintaining the same flotation capacity in the smaller device.

SUMMARY OF THE INVENTION

According to the invention a process for separating emulsified or suspended substances from waste water by electroflotation comprises passing that waste water through electrodes consisting of perforated material to produce a foam of gas and entrapped particles which were suspended or emulsified in the waste water and removing the foam. The diameter of the apertures of the material of the lower electrode is at most 5 millimeters and at least as large as is necessary to ensure proper passage of the liquid without hindrance to the upward movement of the gas bubbles through the liquid. In the present state of the art no allowance is made for the fact that the dimensions of the perforations in the lowermost electrode are of essential importance for a good performance.

DETAILED DESCRIPTION OF THE INVENTION

The invention is directed to a process for removing suspended and emulsified particles from waste water by electroflotation and to the apparatus for effecting that process.

The apparatus of the invention is a flotation cell, which substantially consists of a vessel with an inlet for aqueous emulsions, dispersions or colloidal solutions, an outlet for treated water and an outlet for floated foam, which vessel is provided with two electrodes of perforated material, each electrode being provided with terminals for applying a voltage and which electrodes are in a relationship such that one electrode is disposed over the other electrode in the flotation cell. The flotation cell is characterized in that the diameter of the apertures in the material of the lower electrode is at most 5 mm.

In undertaking the process of the invention using the aforementioned apparatus, the lower electrode in the flotation cell is preferably caused to serve as the cathode. Although the lower electrode may act as the anode to effect flotation, such conditions are not optimum for optimizing electroflotation of the waste waters. It is possible to reverse the electrodes, during the process, without disturbing the flotation process. The possibility of reversing the electrodes during the process is important for cleaning the electrodes and freeing the electrodes of salts, dissolved in the water, which may deposit on the electrodes during flotation. Salt deposition on the electrodes can adversely affect the generation of gas bubbles at the electrodes. Depending on the salt concentration of the water, the electrodes can be provided with automatic controlls for reversing the polarity of those electrodes for a short time during the process. The electric current density between the electrodes, during the process, may vary from 0.2 to 20 amperes per $dm^2$.

According to the process of the invention, waste water containing emulsified and suspended substances is passed into the flotation cell and through the electrodes. Preferably, the waste waters will be directed to flow through the electrodes in a direction opposite to the direction of movement of the gas bubbles generated at the electrode. The direction of the flow of the waste water which is to be treated may be introduced into the flotation cell in the same direction as the direction of movement of the gas bubbles, if the waste water which is to be treated contains contaminants which will not block the perforated electrodes. The rate of flow of waste water into the flotation cell is not critical and may range from 0 to 8 m/hr.

With respect to passage of the waste water through the perforated material forming the electrodes, it is essential that the diameter of the apertures of the perforated material forming the lower electrode does not exceed 5 millimeters. Preferably, the diameter of the apertures of the perforated material of the lower electrode ranges from at least about 0.5 millimeters to at most 3 millimeters.

According to the process of the invention, suspended and emulsified particles are entrapped by the gas bubbles the moment that the gas bubbles are generated at the electrodes. The essence of the flotation process resides in the fact that adhesion between, or entrapment by, the gas bubbles and particles is effected extremely rapidly. As a result of this process, treating times are considerably shortened, and energy consumption is reduced. Moreover, the necessity of addition of flotation chemicals has been obviated by virtue of the process.

The present process is particularly suitable for the removal of malodorous emulsified oily components from waste waters emanating from naphtha-cracking plants and for the prepurification of feeds for biological purifying installations of waste water. Surprisingly, it has also appeared that addition of emulsified oil to naphthacracker waste water enables the odor number to be reduced further than would be possible without this addition.

To carry out the process according to the invention, known devices, for instance that disclosed in the German Pat. No. 1,203,702, may be employed, with substitution of electrodes of the prior art devices, by the type of electrodes required by the process of this application. Because of the increased flotation capacity in accordance with the process of the invention, higher throughputs can be obtained than in the prior art devices, merely by substitution of the electrodes as required by the invention. Optionally, a liquid column over the electrodes may be reduced in size, because the time needed for the gas bubbles to adhere to the substances that are to be removed is shorter than in prior art devices.

Removal of the foam containing the gas and separated emulsified or suspended substances is undertaken by known means like skimming or sucking.

Gas generation is effected during the proces by virtue of electrolysis of water which occurs because of the presence of the contaminants in the waste water which cause the waste water medium to be conductive.

The invention will be illustrated by the following examples.

EXAMPLE 1

In an experimental installation for electroflotation with reversible electrodes and an adjustable height of the liquid over the electrodes, an emulsion of cutting oil in water specially prepared for this purpose was treated in various ways, as indicated in Table I below; the oil content was determined before and after treatment.

Table I

| Exp. no. | d mm | Q l/dm$^2$.h | h mm | t min. | i A/dm$^2$ | C mg/l before | after |
|---|---|---|---|---|---|---|---|
| 1 | 8 | 0 | 250 | 15 | 2 | 305 | 300 |
| 2 | 8 | 10 | 250 | 15 | 2 | 290 | 290 |
| 3 | 0.5 | 0 | 21 | 1.25 | 2 | 295 | 260 |
| 4 | 0.5 | 10 | 21 | 1.25 | 2 | 300 | 34 | where
d=mesh width of cathode, in millimeters;
Q=quantity of liquid flowing through electrodes, in liters per dm$^2$ per hour;
h=height of liquid over upper electrode, in millimeters;
t=stay time of emulsion in installation, in minutes;
i=electric current density between electrodes, in amperes per dm$^2$;
C=oil concentration before and after treatment, in mg per liter.

In experiments 1 and 3, the liquid in the cell was stationary. It can be seen (experiment 4) that a considerable decrease of the oil content occurred only when the liquid flowed through the electrodes and the mesh width of the cathode was small.

EXAMPLE 2

In an installation similar to that used in Example 1, turbid waste water from the naphtha-cracking plant, which contained malodorous oily substances, was treated in various ways. The treatment is indicated in Table II below, the effect being as shown. The meaning of the symbols in the heading of the table is the same as in Table I.

Table II

| Exp. no. | d mm | Q l/dm$^2$.h | h mm | t min. | i A/dm$^2$ | effect of treatment turbidity | smell |
|---|---|---|---|---|---|---|---|
| 5 | 8 | 10 | 250 | 15 | 1.2 | no effect | no effect |
| 6 | 8 | 10 | 250 | 15 | 6 | no effect | no effect |
| 7 | 4 | 0 | 250 | 15 | 2 | slight effect; some separation of oil noticeable | slight improvement |
| 8 | 4 | 10 | 250 | 15 | 2 | distinct decrease of turbidity | distinct improvement |
| 9 | 4 | 10 | 83 | 5 | 2 | distinct decrease of turbidity | distinct improvement |
| 10 | 4 | 10 | 83 | 5 | 6 | distinct decrease of turbidity | distinct improvement |
| 11 | 1 | 10 | 33 | 2 | 2 | no turbidity visible any more | only a slight, non-offensive smell of oil still noticeable |
| 12 | 1 | 40 | 133 | 2 | 2 | no turbidity visible any more | |

Here, too, it can be seen that a clear effect occurs only when the liquid flows through the electrodes and that the effect is greater as the mesh width of the electrodes, notably the cathode, is smaller. A long stay time gives no appreciably better effect, as shown by experiments Nos. 11 and 12; the influence of the current density (i) is small.

EXAMPLE 3

Naphtha-cracker effluent had an odor number of 4600. After treatment according to the process of the invention, the odor number had fallen to 2000. Next, quench oil was added to the same effluent. This raised the odor number to 21000. After the treatment, this had decreased to 600.

What is claimed is:
1. In a process for removing emulsified or suspended substances from waste water by flotation technique in a flotation cell in which said emulsified or suspended substances separate as an upper layer on said waste water and then by removing said upper layer from said waste water, wherein said waste water is passed through a pair of operating electrodes, said electrodes being disposed horizontally and at some distance from each other, the improvement comprising forming said electrodes of perforated material, wherein the diameter of the apertures of the material forming the lower electrode is at most 5 millimeters thereby ensuring proper upward movement of gas bubbles which are generated, wherein said electrodes cause the generation of said gas bubbles which entrap said emulsified or suspended substances and cause the suspended or emulsified substances to flow upward to form a foam at the surface of the waste water.

2. Process according to claim 1, wherein the diameter of the apertures in the lower electrode is from at least about half a millimeter to at most three millimeters.

3. Process according to claim 1, wherein said step of passing the waste water is undertaken in a direction opposite to the direction of flow of said gas bubbles.

4. Process according to claim 1, wherein the lower electrode is the cathode.

5. Process according to claim 1, wherein waste water containing malodorous emulsified oily components from naphtha-cracking plants is passed through said electrodes.

6. Process according to caim 5, wherein if naphta-cracking waste water is to be treated oil is emulsified in it beforehand.

7. Process according to claim 1, characterized in a feed flow for biological purifying installations of waste water is passed through said electrodes.

8. A flotation cell comprising a vessel with an inlet for aqueous emulsions, dispersions or colloidal solutions, an outlet for treated water and an outlet for floated foam, provided with two electrodes, of perforated material, horizontally disposed with respect to each other, said electrodes equipped with terminals for applying a voltage, and disposed in said cell, the diameter of the apertures in the material of the lower electrode being at most 5 millimeters.

* * * * *